(12) United States Patent
Scholta et al.

(10) Patent No.: US 7,172,827 B2
(45) Date of Patent: Feb. 6, 2007

(54) FUEL CELLS WITH INTEGRATED HUMIDIFICATION AND METHOD FOR HUMIDIFYING FUEL CELL PROCESS GAS

(75) Inventors: Joachim Scholta, Nersingen (DE); Ludwig Jörrisen, Neu-Ulm (DE); Bernd Gaugler, Ulm (DE)

(73) Assignee: Viessmann Werke GmbH & Co., Allendorf (DE)

( * ) Notice: Subject to any disclaimer, the term of this patent is extended or adjusted under 35 U.S.C. 154(b) by 139 days.

(21) Appl. No.: 10/276,236

(22) PCT Filed: Jan. 30, 2002

(86) PCT No.: PCT/DE02/00334

§ 371 (c)(1),
(2), (4) Date: May 7, 2003

(87) PCT Pub. No.: WO02/061867

PCT Pub. Date: Aug. 8, 2002

(65) Prior Publication Data

US 2003/0189416 A1 Oct. 9, 2003

(30) Foreign Application Priority Data

Jan. 31, 2001 (DE) .............................. 101 04 246

(51) Int. Cl.
*H01M 8/04* (2006.01)
(52) U.S. Cl. .................... 429/26; 429/17; 429/33; 429/34
(58) Field of Classification Search ............... None
See application file for complete search history.

(56) References Cited

U.S. PATENT DOCUMENTS

| 5,432,020 | A | 7/1995 | Fleck |
| 5,434,016 | A | 7/1995 | Benz et al. |
| 5,441,821 | A | 8/1995 | Merritt et al. |
| 6,013,385 | A * | 1/2000 | DuBose ................. 429/17 |
| 6,106,964 | A | 8/2000 | Voss et al. |
| 6,787,255 | B2 * | 9/2004 | Misumi ................. 429/13 |

FOREIGN PATENT DOCUMENTS

| EP | 0 301 757 | 7/1988 |
| EP | 0 629 014 | 5/1994 |
| JP | 07176313 | 7/1995 |

* cited by examiner

*Primary Examiner*—John S. Maples
(74) *Attorney, Agent, or Firm*—The Webb Law Firm

(57) ABSTRACT

The invention relates to a fuel cell with integrated humidification, comprising a cathode-side or anode-side humidification unit with a heat exchanger, a condensate separator, a capillary tube and a Venturi nozzle and/or pump. The invention also relates to a method for humidifying process gas for the operation of a fuel cell wherein only product water is used and wherein, according to a first embodiment, the gas containing $O_2$ for the cathode is humidified by the cathode off-gas which contains water vapor by means of a first humidification unit and/or the combustion gas containing $H_2$ for the anode is humidified by the anode off-gas which contains water vapor by means of a second humidification unit or wherein, according to a second embodiment, the combustion gas containing $H_2$ for the anode is humidified by the cathode off-gas which contains water vapor by means of a first humidification unit and/or the gas containing $O_2$ for the cathode is humidified by the anode off-gas which contains water vapor by means of a second humidification unit.

9 Claims, 2 Drawing Sheets

FUEL CELLS WITH INTEGRATED HUMIDIFICATION AND METHOD FOR HUMIDIFYING FUEL CELL PROCESS GAS

BACKGROUND OF THE INVENTION

1. Field of the Invention

The invention relates to fuel cells with integrated humidification as well as a method for humidifying process gas for the operation of a fuel cell.

Because of their high efficiency and low pollutant and noise emission, fuel cells are very well suited for independent current generation in smaller and medium units, for traction applications, as well as for combined current- and heat generation.

To avoid a desiccation of the electrolyte membrane, it is necessary with fuel cells, especially with fuel cells having proton-conducting electrolyte membranes or polymer electrolyte membranes (PEM cells) that the process gases, i.e., gas containing $O_2$ for the cathode side and fuel gas containing $H_2$ for the anode side, are humidified. Many methods have already been proposed for the humidification of the process gases of fuel cells.

2. Brief Description of the Related Art

EP 0,629,014 B1 describes a method and a device for humidifying process gas for the operation of fuel cells, where water from an external supply line is sprayed into the process gas through a fine atomizing nozzle. The water quantity is adjusted by a dosing valve arranged in the supply line depending on the gas quantity to be humidified and the temperature.

EP 0,301,757 A2 describes a fuel cell with an ion-conducting electrolyte membrane where water is injected into the anode side through an external supply line to humidify and cool the fuel cell.

JP 07,176,313 A describes an arrangement comprised of a fuel cell and a heat exchanger, where water supplied by an external supply line is evaporated by the heat extracted from the used air of the cell and used to humidify the air to be supplied to the cell.

U.S. Pat. No. 6,106,964 describes an arrangement of a PEM-fuel cell and a combined heat- and humidity exchanger comprising a process gas feed chamber and a process waste gas chamber separated by a water-permeable membrane. The water and heat from the process waste gas flow are transferred to the process gas feed flow through the water-permeable membrane. Although product water is used directly in this arrangement for humidifying the fuel cell, it is difficult or impossible to regulate the feedback portion of the product water. Furthermore, any contaminations in the product water, such as metal ions, are continually circulated, which can lead to an impairment of the cell and the water-permeable membrane during extended operation.

SUMMARY OF THE INVENTION

Thus, the invention is based on providing a fuel cell with integrated humidification which does not need external water feed systems and dosing arrangements and nevertheless enables increased operational safety with the lowest possible additional heat requirement of the fuel cell. Another goal is to provide a simple method for humidifying process gas for the operation of a fuel cell of this type.

Therefore, according to a first embodiment, the object of the invention is a fuel cell with integrated humidification, comprising

- a fuel cell unit with an anode, a polymer electrolyte membrane (PEM) and a cathode,
- a feed line for gas containing $O_2$, preferably air, to the cathode,
- a discharge line for cathode waste gas containing water vapor,
- a feed line for fuel gas containing $H_2$ to the anode,
- a discharge line for anode waste gas containing water vapor,
- a first humidification unit for the gas containing $O_2$ and/or a second humidification unit for the fuel gas containing $H_2$, with the first humidification unit comprising
- a first heat exchanger through which the feed line for gas containing $O_2$ and the discharge line for cathode waste gas containing water vapor are guided, whereby the discharge line downstream of the first heat exchanger is connected to the feed line upstream of the first heat exchanger through a first condensate separator and a first capillary tube and the first capillary tube runs into a Venturi-nozzle installed in the feed line and/or into a pump installed in the feed line,
- and/or the second humidification unit comprises a second heat exchanger through which the feed line for fuel gas containing $H_2$ and the discharge line for anode waste gas containing water vapor are guided, whereby the discharge line downstream of the second heat exchanger is connected to the feed line upstream of the second heat exchanger through a second condensate separator and a second capillary tube and the second capillary tube runs into a Venturi-nozzle installed in the feed line and/or into a pump installed in the feed line.

Another object of the invention is a method for the humidification of process gas for the operation of a fuel cell of this type, where the gas containing $O_2$ for the cathode is humidified by the cathode waste gas containing water vapors through the first humidification unit and/or the fuel gas containing $H_2$ for the anode is humidified by the anode waste gas containing water vapor through the second humidification unit.

According to a second embodiment, another object of the invention is a fuel cell with integrated humidification, comprising

- a fuel cell unit with an anode, a polymer electrolyte membrane (PEM) and a cathode,
- a feed line for gas containing $O_2$, preferably air, to the cathode,
- a discharge line for cathode waste gas containing water vapor,
- a feed line for fuel gas containing $H_2$ to the anode,
- a discharge line for anode waste gas containing water vapor,
- a first humidification unit for the gas containing $O_2$ and/or a second humidification unit for the fuel gas containing $H_2$, with the first humidification unit comprising
- a first heat exchanger through which the feed line for fuel gas containing $H_2$ and the discharge line for cathode waste gas containing water vapor are guided, whereby the discharge line downstream of the first heat exchanger is connected to the feed line upstream of the first heat exchanger through a first condensate separator and a first capillary tube and the first capillary tube runs into a Venturi-nozzle installed in the feed line and/or into a pump installed in the feed line,
- and/or the second humidification unit comprises a second heat exchanger through which the feed line for gas containing $O_2$ and the discharge line for anode waste gas containing water vapor are guided, whereby the discharge line downstream of the second heat exchanger is connected to the feed line upstream of the second heat exchanger through a second condensate separator and a second capillary tube and the second capillary tube runs into a Venturi nozzle installed in the feed line and/or into a pump installed in the feed line.

DETAILED DESCRIPTION OF THE PREFERRED EMBODIMENTS

Figure 1:
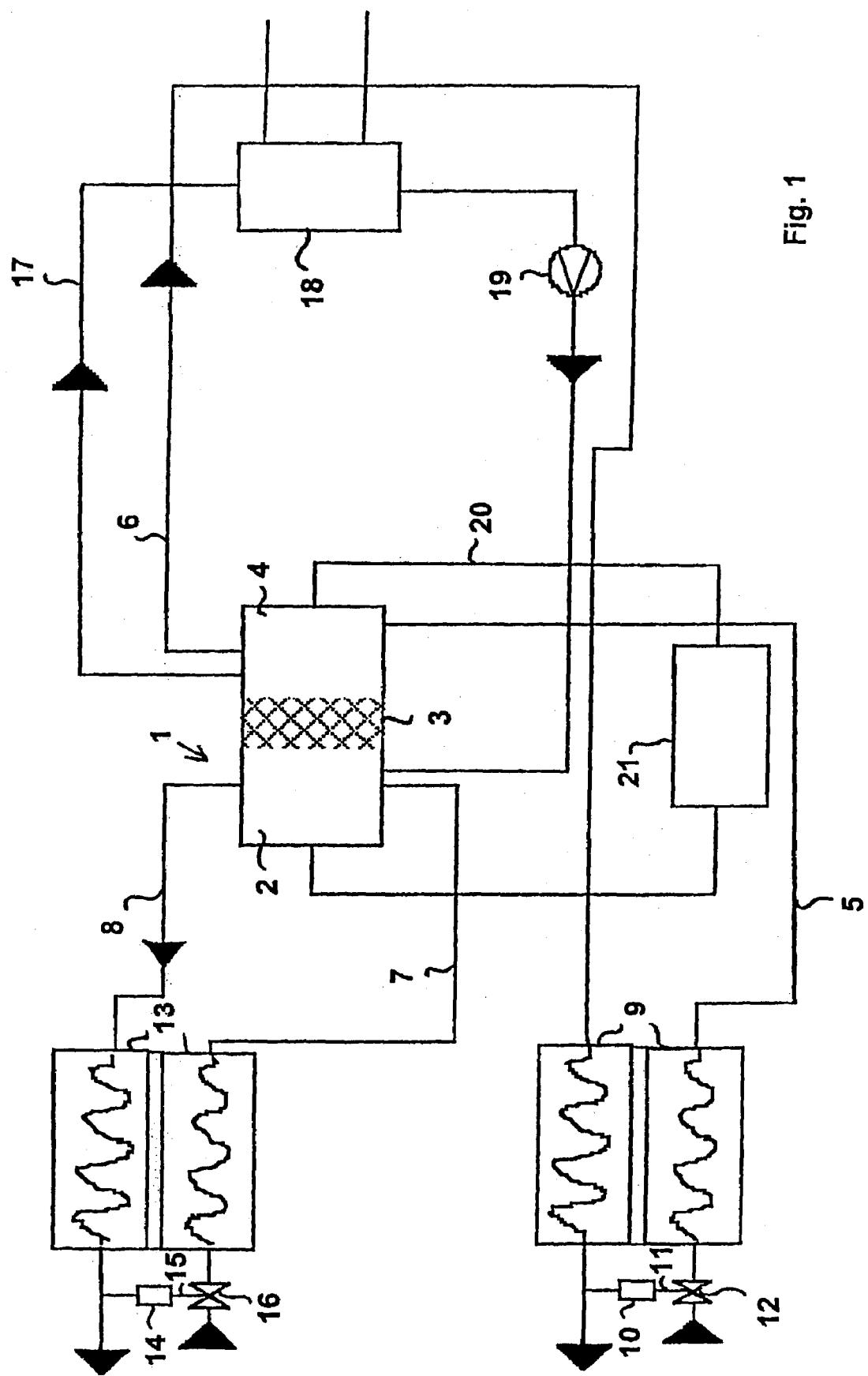
FIG. 1 is a schematic circuit diagram of a fuel cell with integrated humidification in accordance with the present invention.

Finally, another object of the invention is a method for humidifying process gas for the operation of a fuel cell of this type, where the fuel gas containing $H_2$ for the anode is humidified by the cathode waste gas containing water vapor through the first humidification unit and/or the gas containing $O_2$ for the cathode is humidified by the anode waste gas containing water vapor through the second humidification unit.

The invention takes advantage of the fact that the fuel cell at the cathode side as well as at the anode side produces sufficient water to guarantee humidification at the cathode entry side as well as the anode entry side under all operating conditions, as far as the generated product water can be extracted from the cathode waste gas flow and/or the anode waste gas flow.

According to the invention, the feedback of the product water without the help of auxiliary units also takes advantage of the fact that the difference in pressure between the heat exchange entry before and the heat exchange exit after the fuel cell can be overcome by means of a Venturi nozzle. In that way, the product water is continuously fed back through the process gases of the fuel cell, thus guaranteeing sufficient humidification of the electrolyte membrane. The feedback portion of the generated product water can be determined with the selected process gas conversion rate as well as the design of the heat exchangers.

If the pressure difference that can be applied through the Venturi nozzle is not sufficient for the cycle consisting of heat exchanger, fuel cell, unit and heat exchanger, a pump into which the respective capillary tube runs can be installed instead of the Venturi nozzle or in addition to the Venturi nozzle.

According to the first embodiment of the invention, it is possible to provide either only the first humidification unit for the cathode side or only the second humidification unit for the anode side. Preferably, however, both humidification units are used in the operation. If only one humidification unit is provided, it is preferred to use the first humidification unit for the cathode side because the quantity of the product water is larger at the cathode side than at the anode side. According to the second embodiment of the invention, it is possible to provide either only the first humidification unit for the fuel gas containing $H_2$ or only the second humidification unit for the gas containing $O_2$. Preferably, however, both humidification units are used in the operation. If only one humidification unit is provided, it is preferred to provide the first humidification unit for the fuel gas containing $H_2$ because the quantity of product water supplied by the cathode waste gas is greater than in the case of the anode waste gas. A positive side effect of the latter alternative is that the cathode waste gas supplies small quantities of oxygen to the fuel gas containing $H_2$, which can be used to oxidize CO, which is present in the fuel gas in small parts and acts as catalyst poison, into harmless $CO_2$ through a conventional CO-selective catalyst layer present at the anode. If necessary, additional auxiliary arrangements can be provided to control the oxygen quantity required for this purpose.

Because the product water of the fuel cell is used directly in accordance with the invention, rather than having to supply water from an external supply unit, two significant improvements are achieved compared to the conventional mode of operation, where external water supply lines are installed: First, a dosing arrangement to inject a precisely defined quantity of water depending on the respective operating condition is no longer required because in accordance with the principle described in the invention, a constant fraction of the product water is always added in dosages, thus rendering making an additional control obsolete. Nevertheless, the humidification units in accordance with the invention can optionally still comprise a control system such as a dosing pump to enable an even more accurate dosing of the condensate water to be supplied to the feed lines.

Secondly, in accordance with the invention, external storage containers and feed lines for water are obsolete, and the fuel cell can be operated continuously without having to add doses of external water.

Compared to the state of the art described in U.S. Pat. No. 6,106,964, where a water-permeable membrane is used to humidify the process gases, the principle in accordance with the invention has the advantage that the feedback portion of the product water to the cell can be varied in a simple manner, for example by controlling the pressure differences before and after the Venturi nozzle, such as by changing the flow speeds of the process gases or by varying the Venturi-nozzle, by varying the diameter of the capillary tubes, which suitably have an interior diameter of 0.2 to 10 mm, preferably 1 to 4 mm, or by the design of the heat exchangers, such as the variation of the heat exchange surface. Furthermore, it is possible compared to said state of the art to purify and/or de-ionize the product water generated as condensate by providing a purification unit, for example by providing a demineralization cartridge for the condensate water. In addition to the humidification by means of product water, this makes it possible to remove damaging decontaminations from the fuel cell system, such as metal ions in the cycled product water.

Apart from the humidification units provided in accordance with the invention, the other components of the fuel cell are of conventional type and design. Thus, the fuel cell can optionally comprise a coolant cycle connected to the fuel cell unit, having another heat exchanger and a pump to recirculate coolant, to make use of the combined current- and heat generation of the cell.

The fuel cell unit is typically a fuel cell stack that comprises a plurality of single fuel cells.

The invention is explained in detail in the enclosed illustration, where FIG. 1 is a schematic circuit diagram of a first embodiment of a fuel cell with integrated humidification in accordance with the invention. With reference to FIG. 1, 1 shows a fuel cell unit with an anode 2, a polymer electrolyte membrane 3 and a cathode 4, a feed line 5 for gas containing $O_2$, preferably air, a discharge line 6 for cathode waste gas containing water vapor, a feed line 7 for fuel gas containing $H_2$ and a discharge line 8 for anode gas containing water vapor. The embodiment shown here provides a first humidification unit with a first heat exchanger 9, a first condensate separator 10 and a first capillary tube 11 and a Venturi nozzle 12 installed in the feed line 5, as well as a second humidification unit with a second heat exchanger 13, a second condensate separator 14 and a second capillary tube 15 and a Venturi nozzle 16 installed in the feed line 7. The two heat exchangers 9, 13 are preferably heat exchangers working in counter-current flow, and furthermore preferably a plate heat exchangers with a heat exchange surface of, for example, 0.05 to 2 m² per 100 liters of flow-through gas per minute.

The process gas flows are guided such that the gas to be humidified is guided through the Venturi nozzle, where it is mixed with the product water coming from the condensate separator. The resulting gas-water mixture then flows through the heat exchanger, where the heat energy required for the evaporation of the water in the gas-water mixture is added. The process gas humidified in this way then flows through the fuel cell, where it is enriched with more humidity in the form of product water, it is partially reacted, and then flows in the opposite direction through the respective heat exchanger. In said heat exchanger, the waste gas is condensed by cooling and the thermal energy content and the condensation heat are released.

After passing through the heat exchanger, the resulting cooled gas-water mixture is separated in the condensate separator 10, 14, purified by means of the purification unit 23 (see FIG. 2, preferably a demineralization cartridge), and the condensate water, together with a small portion of waste gas, are fed to the inflowing process gas by the negative pressure in the Venturi nozzle. The degree of humidification of the inflowing process gas can be selected and/or varied, for example, by a design of the heat exchanger surface or by adjusting the flow speed of the process gases.

Figure 2:
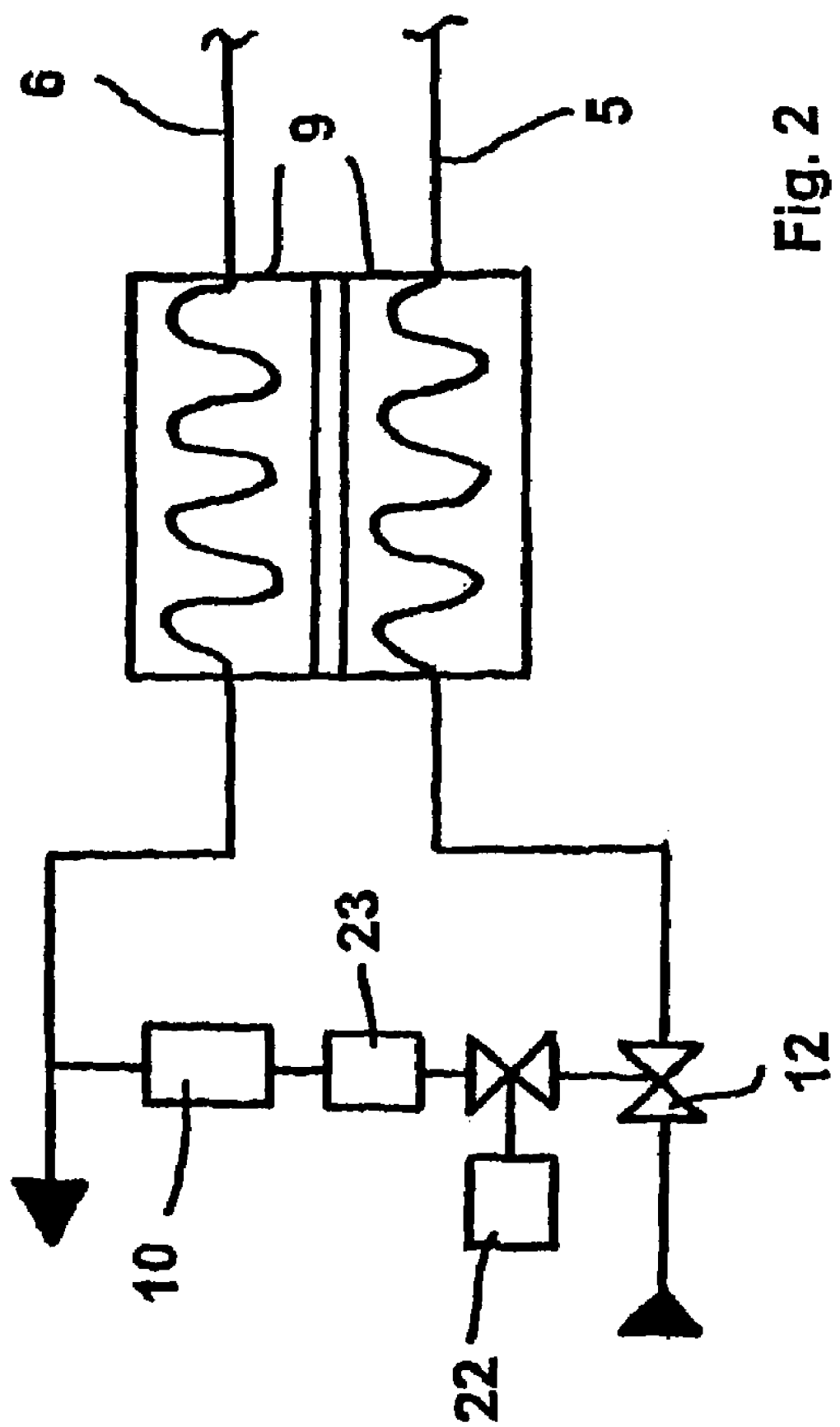
FIG. 2 is a schematic circuit diagram of a fuel cell with integrated humidification in accordance with another embodiment of the present invention.

For example, the humidification units can also comprise a control system 22 to be able to dose the quantity of the condensate water to be supplied to the feed lines 5, 7, as shown in FIG. 2.

The shown embodiment furthermore comprises a coolant cycle 17 with heat exchanger 18 and a pump 19 to recirculate coolant. The current generated in the fuel cell is supplied to an inverter 21 through the current circuit 20 for load decrease.

EXAMPLE

According to the arrangement shown in FIG. 1, a fuel cell with a humidification unit is set up only at the cathode side and the system with the data shown in Table 1 below is operated with respect to the humidity content of the cathode gases.

TABLE 1

Humidity content with integrated cathode humidification

| Primary side = used air side BZ | | | | | | | | |
|---|---|---|---|---|---|---|---|---|
| Flow speed (liters per minute) | T in (° C.) | r.F. in (%) | TP in (° C.) | T out (° C.) | r.F. out (%) | TP out (° C.) | Δ p 1,2 tube (mbar) | Δ p 2,3 use (mbar) |
| 100 | 59.7 | 100 | 59.7 | 38.4 | 100 | 38.4 | 19.7 | 29.4 |
| 150 | 69.7 | 53.5 | 55.9 | 45.5 | 98.2 | 45.2 | 54 | 63 |
| 150 | 61.3 | 100 | 61.3 | 51.7 | 100 | 51.7 | 54 | 63 |

TABLE 1-continued

| Secondary side = supply air BZ | | | | | | |
|---|---|---|---|---|---|---|
| Flow speed (liters per minute) | T in (° C.) | r.F. in (%) | TP in (° C.) | T out (° C.) | r.F. out (%) | TP out (° C.) |
| 100 | 19.1 | 12.9 | −8.9 | 54 | 67.6 | 46.1 |
| 150 | 22.6 | 13.1 | −6.3 | 46.3 | 60.1 | 36.7 |
| 150 | 22.6 | 13.1 | −6.3 | 36.1 | 99.1 | 35.9 |

Symbols in the table:
BZ: fuel cell
T in: temperature at the entry side
r.F. in: relative humidity at the entry side
TP in: dew point at the entry side
T out: temperature at the exit side
r.F. out: relative humidity at the exit side
TP out: dew point at the exit side
Δ p 1.2 tube: Pressure difference in the cathode gas feed line before and after the Venturi nozzle
Δ p 2/3 use: Pressure difference between capillary tube and exit of Venturi nozzle The table shows that with the heat exchanger design realized here (0.22 m² heat exchanger surface) it is possible, depending on the air quantity driven and with a fuel cell-side starting dew point of approximately 60° C., to adjust to an entry-side dew point between approximately 36 and 46° C.

LIST OF REFERENCE SYMBOLS

1 Fuel cell
2 Anode
3 Polymer electrolyte membrane
4 Cathode
5 Feed line
6 Discharge line
7 Feed line
8 Discharge line
9 Heat exchanger
10 Condensate separator
11 Capillary tube
12 Venturi nozzle
13 Heat exchanger
14 Condensate separator
15 Capillary tube
16 Venturi nozzle
17 Coolant cycle
18 Heat exchanger
19 Pump
20 Current cycle
21 Inverter
22 Control system
23 Purification unit

The invention claimed is:
1. A fuel cell with integrated humidification, comprising:
a fuel cell unit with an anode;
a polymer electrolyte membrane (PEM) and a cathode;
a feed line to the cathode for gas containing $O_2$, preferably air;
a discharge line for cathode waste gas containing water vapor;
a feed line to the anode for fuel gas containing $H_2$;
a discharge line for anode waste gas containing water vapor;

a first humidification unit for the gas containing $O_2$ optionally a second humidification unit for the fuel gas containing $H_2$, wherein the first humidification unit includes a first heat exchanger through which the feed line for gas containing $O_2$ and the discharge line for cathode waste gas containing water vapor are guided, wherein the discharge line downstream of the first heat exchanger is connected to the feed line upstream of the first heat exchanger through a first condensate separator and a first capillary tube and the first capillary tube runs into a Venturi nozzle installed in the feed line and optionally a pump installed in the feed line; and optionally a second humidification unit for the fuel gas containing $H_2$, wherein the second humidification unit includes a second heat exchanger through which the feed line for fuel gas containing $H_2$ and the discharge line for anode waste gas containing water vapor are guided, wherein the discharge line downstream of the second heat exchanger is connected to the feed line upstream of the second heat exchanger through a second condensate separator and a second capillary tube and the second capillary tube runs into a Venturi nozzle installed in the feed line and optionally a pump installed in the feed line.

2. The fuel cell in accordance with claim 1, comprising a coolant cycle connected to the fuel cell unit, having a heat exchanger and a pump to recirculate coolant.

3. The fuel cell in accordance with claim 1, wherein the fuel cell unit is a fuel cell stack comprising a plurality of single fuel cells.

4. The fuel cell in accordance with claim 1, wherein the capillary tubes have an interior diameter of about 0.2 to 10 mm.

5. The fuel cell in accordance with claim 1, wherein the capillary tubes have an interior diameter of about 1 to 4 mm.

6. The fuel cell in accordance with claim 1, wherein the humidification units comprise a control system to dose the quantity of the condensate water to be supplied to the feed lines.

7. The fuel cell in accordance with claim 1, wherein a purification unit is provided in the humidification units to purify and optionally de-ionize the condensate water.

8. The fuel cell in accordance with claim 1, wherein the purification unit is a demineralization cartridge.

9. A method for humidifying process gas for the operation of a fuel cell as defined in claim 1, wherein the gas containing $O_2$ for the cathode is humidified by the cathode waste gas containing water vapor through a first humidification unit and optionally the fuel gas containing $H_2$ for the anode is humidified by the anode waste gas containing water vapor through the second humidification unit.

* * * * *

UNITED STATES PATENT AND TRADEMARK OFFICE
CERTIFICATE OF CORRECTION

PATENT NO. : 7,172,827 B2 Page 1 of 1
APPLICATION NO. : 10/276236
DATED : February 6, 2007
INVENTOR(S) : Scholta et al.

It is certified that error appears in the above-identified patent and that said Letters Patent is hereby corrected as shown below:

Column 7, Lines 1-3, delete the following:
"optionally a second humidification unit for the fuel gas containing $H_2$,"

Column 8, Line 18, Claim 8, "in accordance with Claim 1" should read
-- in accordance with Claim 7 --

Signed and Sealed this

Fifteenth Day of May, 2007

JON W. DUDAS
*Director of the United States Patent and Trademark Office*